Patented Feb. 16, 1932

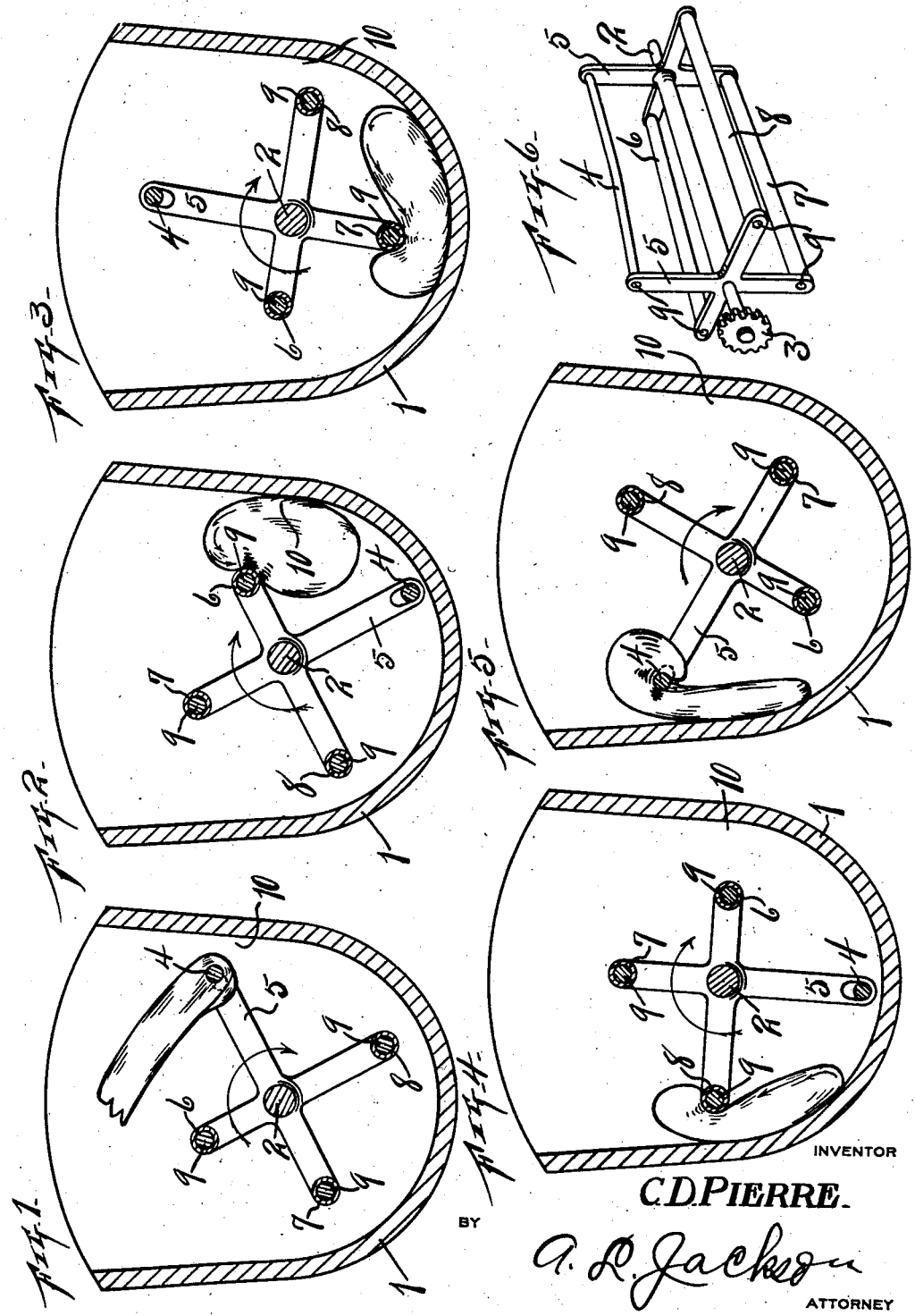

1,845,329

UNITED STATES PATENT OFFICE

CLAUDE D. PIERRE, OF DALLAS, TEXAS

DOUGH KNEADER

Application filed March 6, 1931. Serial No. 520,532.

My invention relates to dough mixers and more particularly to dough mixers for making bread and the like; and the object is to provide a dough mixer which approximates the mixing of dough manually; to provide a mixer which does not cut or tear the formed roll of dough, but kneads the same in such manner that the ingredients are confined in the roll of dough while it is being kneaded. The advantage gained by such operation is that the natural flavor of the ingredients is conserved and not destroyed in the operation of mixing. Other objects and advantages will be fully explained in the following description and the invention will be more particularly pointed out in the claims.

Reference is had to the accompanying drawings which form a part of this application.

Fig. 1 is a vertical section of a dough mixing receptacle and sections of the kneading devices.

Fig. 2 is a similar view, but showing the first kneading roller engaging the roll of dough.

Fig. 3 is a similar view, but showing the second kneading roller engaging the roll of dough.

Fig. 4 is a similar view showing the third kneading roller engaging the roll of dough.

Fig. 5 is a similar view showing the pick up rod engaging the dough.

Fig. 6 is a perspective view of the kneading devices.

Similar characters of reference are used to indicate the same parts throughout the several views.

A receptacle 1 is provided which is to be mounted in stationary bearings. A shaft 2 is journaled in the receptacle 1 and a spider having four arms is rigid with the shaft 2. The shaft 2 may be driven by any suitable power, using a drive wheel 3 which is rigid with the shaft 2. The lower part of the receptacle should be in the form of a semicircle. A pick up bar or roll former 4 is rigid with the longest arm 5 of the spider. The kneading rollers 6, 7, and 8 are mounted on shafts 9 which are journaled in the spider arms and these rollers are graduated as to distance from the central shaft 2, roller 6 being the nearest to the shaft, roller 7 being the next to the nearest, and roller 8 being the farthest from the central shaft, but the pick up bar 4 is farthest from the central shaft. The pick up bar 4 is bent inwardly intermediate its ends as illustrated in Fig. 3. The object is to work the dough slightly towards the center of the mixer. The bar 4 runs closest to the interior of the mixing chamber for mixing and picking up the ingredients preliminary to forming a roll.

In operation, the ingredients are poured into the receptacle 1 in the proper proportions. The shaft 2 is then driven at a suitable speed. The bar 4 carries the preliminary roll and will deposit the roll approximately at the point 10 in the mixer receptacle. The first kneading roller 6 will then engage the roll of dough and move it. The kneading roller 7 will then operate on the roll and move it a short distance and release it. (See Fig. 3.) The roller 8 will then engage the dough roll and move it to the point shown in Fig. 4 and release the same. The bar 4 will again pick up the roll of dough and deliver the same to be engaged by the kneading rollers 6, 7, and 8 as before and this operation will go on until the dough has been properly mixed and kneaded. The ingredients to be mixed are in the lower part of the mixer bowl to commence operations. The pick up bar 4 first engages the ingredients and aids in forming the ingredients into a dough mass. After this preliminary formation, the pick up bar 4 does not engage the rolled dough in the bottom of the bowl, but engages it in the upper part of the bowl and serves to transfer the dough to the back of the bowl where the kneading rollers engage the roll of dough and carries the roll to the bottom of the bowl and on back to the upper part of the bowl. It will be seen that there is more clearance at all times between the kneading rollers and the pick up bar and the bowl after the dough roll is once formed. The advantage of more clearance is to reduce friction which is undesirable and disadvantageous to the proper development of the gluten in the flour. This is one advantage of the machine in that the gluten is developed by stages or degrees and not violently and in such development the glutent is not broken down and its natural properties are conserved.

It must be understood that more or less kneading rollers may be used.

It is apparent that various changes in the sizes, proportions, construction and arrangement may be made without departing from my invention.

What I claim is:—

1. A dough mixer comprising a receptacle having a semicircular bottom, an agitator having a shaft and a plurality of arms all of different lengths and systematically graduated from the shaft, a pick up bar rigid with the longest arms at the ends thereof, kneading rollers journaled in the other arms and graduated as to distance from said shaft, the roller in the shortest arms receiving and engaging the roll of dough as it leaves the pick up bar and the other rollers in succession engaging the roll of dough when released by the preceding roller and the roller farthest from said shaft delivering the roll of dough to said pick up bar.

2. A dough mixer comprising a receptacle having a semicircular bottom, an agitator having a shaft and a plurality of pairs of arms all of different lengths and all pairs of different lengths systematically graduated from said shaft, a pick up bar rigid with the longest arms and bent inwardly immediate its ends for initially forming a roll of dough, kneading rollers journaled in the other arms and graduated as to distance from said shaft, the roller nearest said shaft receiving the roll of dough from said pick up bar and delivering the same to the next roller or second nearest roller and the latter delivering the roll of dough to the next or third roller and the latter delivering the roll of dough to said pick up bar, and means for driving said shaft.

3. A dough mixer comprising a receptacle having a semicircular bottom, an agitator having a shaft journaled in said casing and a plurality of pairs of arms of different lengths and all pairs of different lengths and rigid with said shaft, a pick up bar rigid with the longest pair of arms for initially forming a roll of dough, kneading rollers journaled in the outer ends of said arms, the rollers in the shortest arms receiving the dough from said pick up bar and delivering the same to the kneading roller in the next longer arms and the latter kneading roller delivering the same dough to the kneading roller in the longest arms and the latter kneading roller delivering the same dough to said pick up roller and all of said kneading rollers being spaced further from said casing than said pick up bar, said rollers being systematically graduated from said shaft radially outward for progressive kneading of the dough.

4. A dough mixer comprising a receptacle having a semicircular bottom, an agitator having a shaft and a plurality of pairs of arms all of different lengths and all pairs of different lengths systematically graduated from said shaft, a pick up bar rigid with the longest arms for initially forming a roll of dough, kneading rollers journaled in the other arms and graduated as to distance from said shaft for progressive kneading of the dough and then delivering the same to said pick up bar.

In testimony whereof, I set my hand, this 3rd day of January, 1931.

CLAUDE D. PIERRE.